United States Patent [19]

Uchida et al.

[11] Patent Number: 5,144,639
[45] Date of Patent: Sep. 1, 1992

[54] SPREAD-SPECTRUM COMMUNICATION SYSTEM

[75] Inventors: Yoshitaka Uchida; Takeshi Hashimoto, both of Tokyo, Japan

[73] Assignee: Clarion Co., Ltd., Tokyo, Japan

[21] Appl. No.: 578,096

[22] Filed: Sep. 5, 1990

[30] Foreign Application Priority Data

Sep. 8, 1989 [JP] Japan .................................. 1-234240

[51] Int. Cl.⁵ .............................................. G01S 3/16
[52] U.S. Cl. ...................................... 375/1; 342/378; 342/382
[58] Field of Search ...................... 375/1; 342/378, 382

[56] References Cited

U.S. PATENT DOCUMENTS 4,039,749  8/1977  Gordy et al. ........................... 375/1
5,048,052  9/1991  Hamatsu et al. ....................... 375/1

Primary Examiner—Thomas H. Tarcza
Assistant Examiner—David Cain
Attorney, Agent, or Firm—Flynn, Thiel, Boutell & Tanis

[57] ABSTRACT

A spread-spectrum communication system uses a PN code which ensures that the side lobe of a self-correlation function represents zero on both parts of a sender and a receiver.

9 Claims, 4 Drawing Sheets

5,144,639

SPREAD-SPECTRUM COMMUNICATION SYSTEM

FIELD OF THE INVENTION

This invention relates to an improvement of a spread-spectrum communication system.

BACKGROUND OF THE INVENTION

A pseudo-random code (PN code) whose self-correlation characteristic has a sharp peak value is used in many fields, aiming descrimination of a specific signal among a plurality of signals.

One example is the field of radars and sonars in which a received wave, modulated by such a pseudo-random code, then transmitted and reflected back from a reflecting object, is correlated with a reference signal sequence (pseudo-random code) to descriminate a reflected target wave for purposes of distance measurement, etc.

A generally used pseudo-random code is a binary sequence code such as M sequence code or GOLD code sequence.

The self-correlating function of such a pseudorandom code has a nature that its side lobe value does not become zero. FIG. 4 shows such a self-correlating function of an M sequence code.

Therefore, in an environment with a number of reflecting objects, an increase in the cumulative side lobe value causes the peak value of the self-correlating function to be masked, and unables proper detection of the position of a target reflector.

Also in a spread-spectrum multi-channel communication system (hereinbelow abbreviated to SSMA communication system), when combining a plurality of pseudorandom codes modulated by data to form a transmission signal capable of large-scaled data transmission, the side lobe value of the correlation output, which is a received output of a receiver, is increased similarly to the foregoing example, and disturbs data demodulation.

OBJECT OF THE INVENTION

It is therefore an object of the invention to provide a spread-spectrum communication system which includes a simple arrangement for forming a PN code (binary sequence signal) in which the side lobe of a self-correlating function becomes zero.

SUMMARY OF THE INVENTION

According to the invention, there is provided a spread-spectrum communication system comprising: a correlator for correlating a first input with a second signal and obtaining a correlation output; a first code generator responsive to a first clock for generating a first PN code and supplying it as said first input of said correlator; a second code generator responsive to a second clock for generating a second PN code which is time-inverted with respect to said first PN code; logic operation means for effecting logic operation of said second PN code and said second clock and supplying a logic operation output as said second input of said correlator.

The correlation output has a waveform in which the side lobe of the self-correlating function becomes zero. Therefore, by using the combined PN code in the spread-spectrum communication system, data demodulation is executed safely and accurately.

DESCRIPTION OF PREFERRED EMBODIMENTS

Figure 1:
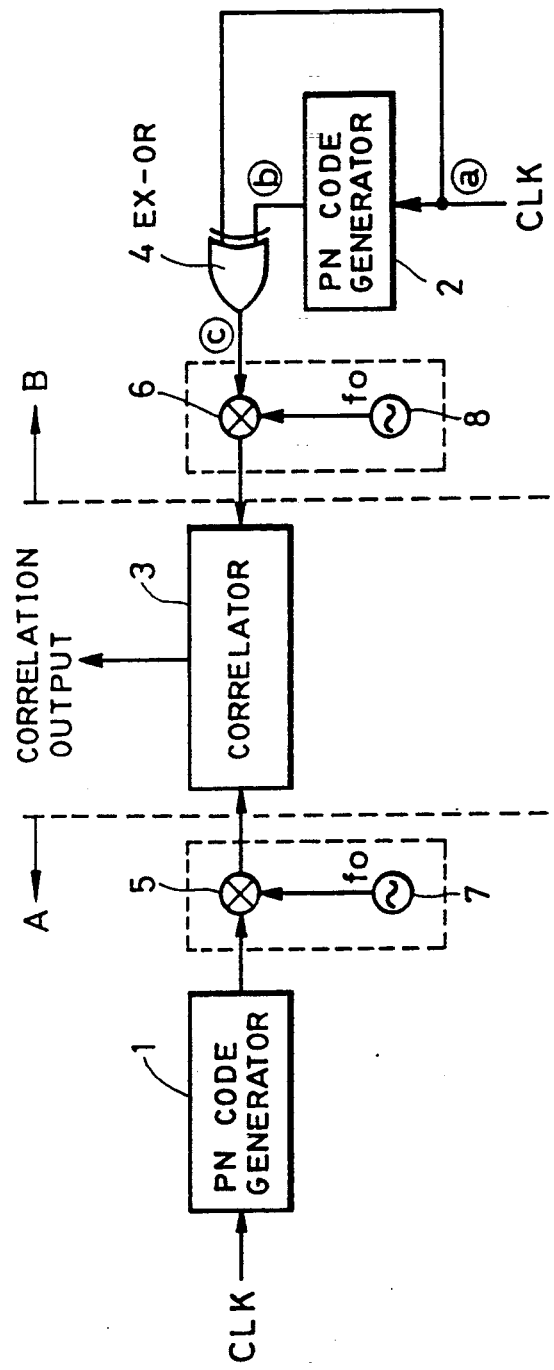
FIG. 1 is a block diagram showing a PN code generating process on both parts of a transmitter and a receiver in a system of the invention.

The invention is described below, referring to preferred embodiments illustrated in the drawings.

FIG. 1 shows a simple process employable in a spread-spectrum communication system according to the invention for generating a binary sequence signal (PN code) in which the side lobe of a self-correlating function becomes zero.

In this figure, reference numerals 1 and 2 denote M sequence code generators or other PN code generators. Numeral 3 refers to a correlator which may be a convolver, 4 refers to an exclusive logic sum circuit, 5 and 6 to multipliers, and 7 and 8 to local oscillators with oscillating frequency $f_0$.

The process of FIG. 1 uses a convolver as the correlator 3: apparently, however, it is not limited to this. the multipliers 5 and 6 and the local oscillators 7 and 8 located in dotted-lined blocks are used for frequency conversion for consistency with an incoming frequency of the convolver; therefore, they are not indispensable for this embodiment.

Symbol CLK refers to a clock for generating an M sequence code, and one chip of the M sequence code corresponds to one cycle of the clock.

Referring to FIG. 1, a normal M sequence code is used as pseudo-random code (PN code) which is a binary sequence signal on the part of A (left input of the convolver)

In contrast, the pseudo-random code, which is a binary sequence signal on the part of B (right input of the convolver), is an exclusive logic sum of a normal M sequence code and a clock (CLK) used for generating the M sequence code.

Figure 2:
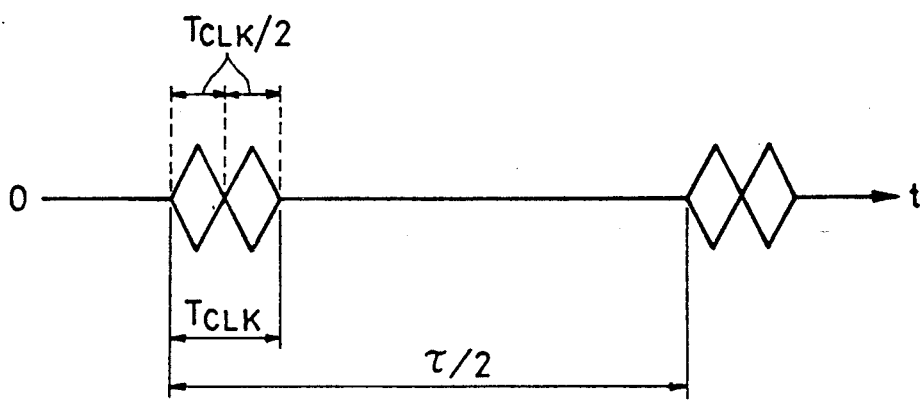
FIG. 2 is a waveform diagram of a correlation output in the process of FIG. 1.

A resulting correlation output has a waveform shown in FIG. 2 in which the side lobe of its self-correlating function is zero.

Since the embodiment uses the convolver, M sequence codes generated by the M sequence code generators 1 and 2 are identical codes which may be in a time-inverted relationship (mirror relationship) as illustrated.

In FIG. 2, symbol $T_{CLK}$ indicates a clock cycle for generating an M sequence code, and $\tau$ represents a gate delay time of the convolver 3. Still referring to FIG. 2, in so far as the same code is used successively, correlation peak is generated also in $\tau/2$.

Figure 3:
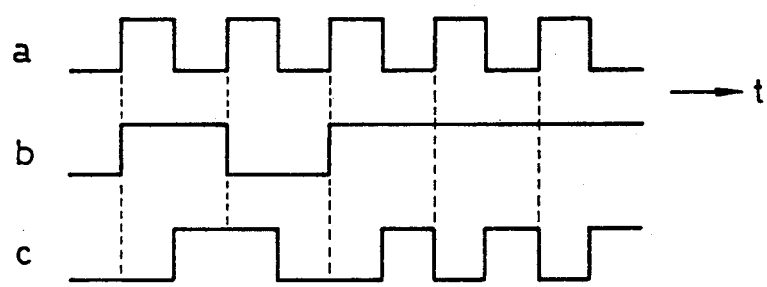
FIG. 3 is a diagram showing waveforms at different points on the part of B in FIG. 1.
Figure 4:
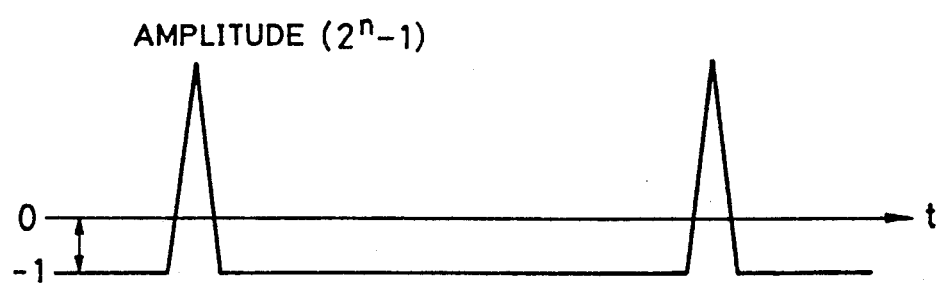
FIG. 4 is a waveform diagram showing a self-correlating function of a prior art M sequence code.

FIG. 3 shows exemplary waveforms at points a, b and c in FIG. 1.

As shown in FIG. 2, two correlation peaks appear concurrently; however, this causes no problem because energy may be composed by extraction of the correlation output via an integrator, etc.

Apparently, the PN code either on the part of A or on the part of B in FIG. 1 may be used in a conventional radar, sonor, or in a sender or a receiver in a conventional multi-channel communication system. For example, the sender may use the M sequence code on the part of A whereas the receiver may use the M sequence code which is an output of the exclusive logic sum circuit 4 on the part of B.

In an arrangement using a matched filter, for instance, as the correlator in lieu of the convolver, the same applies and no problem remains in so far as the part of A or the part of B in FIG. 1 uses a binary sequence pattern.

Figure 5:
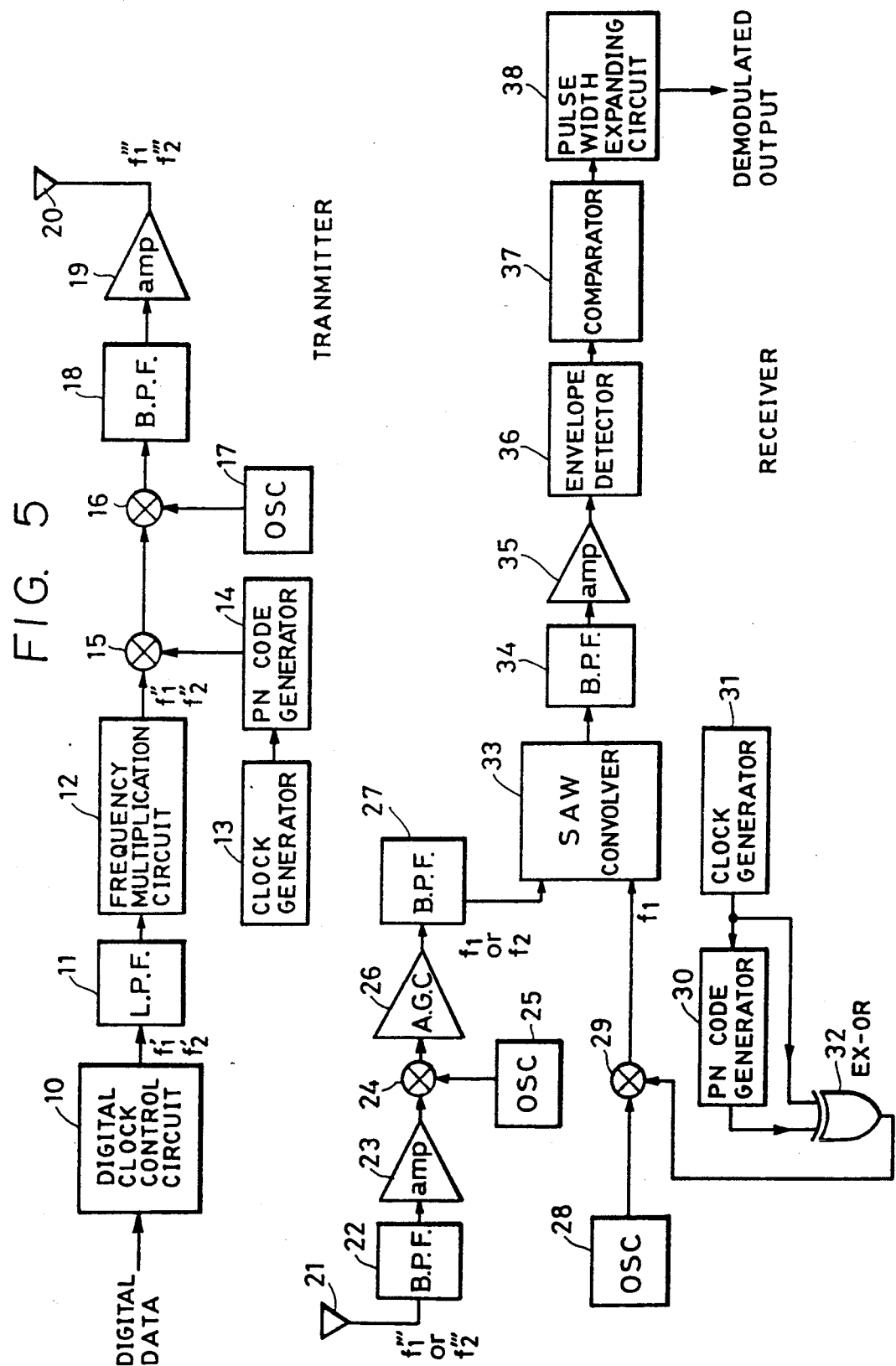
FIGS. 5 and 6 are block diagrams showing different embodiments of the invention using the process shown in FIG. 1.
Figure 6:
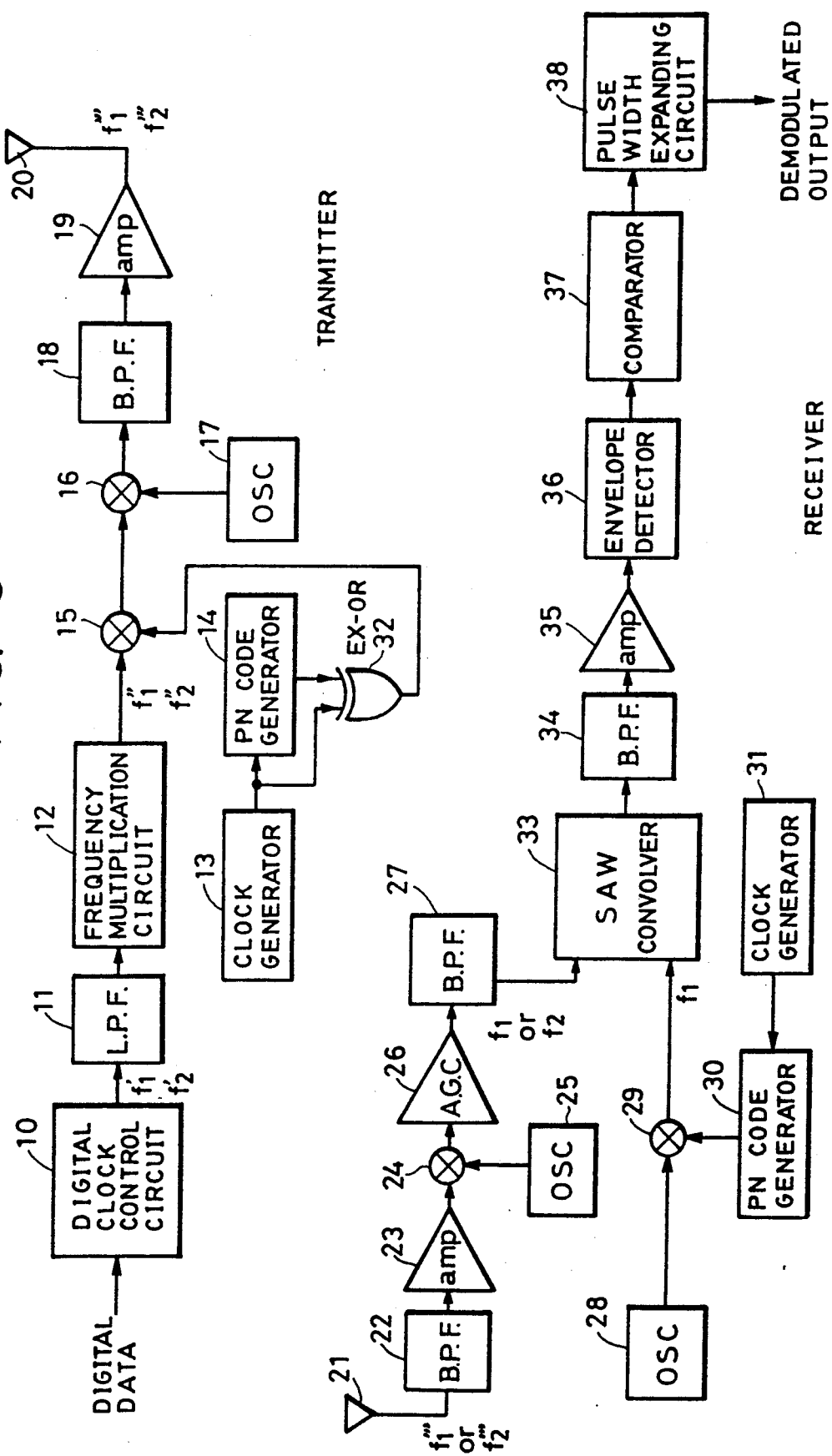

FIGS. 5 and 6 show different embodiments of the communication system of the invention used in asynchronous type spread-spectrum communication apparatuses.

In FIGS. 5 and 6, reference numeral 10 refers to a digital clock control circuit; 11 to a low pass filter; 12 to a frequency multiplication circuit; 13 and 31 to clock generators; 14 to a PN code generator on the part of a sender; 15, 16, 24 and 29 to mixers (multipliers); 17, 25 and 28 are oscillators; 18, 22, 27 and 34 to band pass filters; 19, 23 and 35 to amplifiers, 20 to a sender antenna; 21 to a receiver antenna; 26 to an AGC amplifier; 30 to a receiver PN code generator; 32 to an exclusive logic sum circuit; 33 to a SAW convolver; 36 to an envelope detector; 37 to a comparator; and 38 to a pulse width expanding circuit.

In the embodiment of FIG. 5, the PN code used on the part of the sender is the code generated on the part of A of FIG. 1 whereas the PN code used on the part of the receiver is the code generated on the part of B of FIG. 1.

In the embodiment of FIG. 6, the PN code used on the part of the sender is the code produced on the part of B of FIG. 1 whereas the PN code used on the part of the receiver is the code produced on the part of A of FIG. 1.

First referring to FIG. 5, an outline of the communication system is explained. A carrier is FSK-modulated by the clock control circuit 10, using digital data which is base band information, so as to reform the frequency into f'1 or f'2, which is further converted into f''1 or f''2 by the frequency multiplication circuit 12. Its output is further BPSK-modulated by the mixer 15, using the PN code from the PN code generator 14. Here the PN code need not synchronize with the base band information. An output of the mixer 15 is frequency-converted into a desired RF frequency band (for example, f'''1 or f'''2) by the oscillator 17 and the mixer 16, and it is transmitted from the antenna 20.

On the part of the receiver, a reference signal is applied to the SAW convolver 33. The reference signal is formed by the mixer 29 by BPSK-modulating the carrier from the oscillator 28 with oscillating frequency f1, using a signal indicative of the exclusive logic sum (EX-OR) obtained by the circuit 32 from an output of the PN code generator 30 and a clock signal from the clock generator 31. The output of the PN code generator 30 is a code which is a synchronous with and time-inverted from the PN code on the part of the sender. Therefore, the convolver 33 produces a row of correlation peaks only when the frequency of the received signal is f1 and both PN codes coincide. Therefore, presence and absence of the correlation peak row correspond to "H" and "L" levels of the base band information, respectively. The correlation peak is detected by the envelope detector circuit 36, and the detection output is waveform-shaped by the comparator 37 and applied to the pulse width expanding circuit 38. Thus a demodulated output of the base band information is obtained. The demodulating processing is executed under asynchronization between the carriers and PN codes on both parts of the sender and the receiver.

In the embodiment of FIG. 6, in contrast to the embodiment of FIG. 5, the circuit 32 on the part of the sender obtains a signal indicative of the exclusive logic sum of an output of the PN code generator 14 and a clock signal from the clock generator 13, and applies the obtained signal to an input of the mixer 15.

As explained above, the invention ensures for the side lobe value of the self correlating function of a PN code to represent zero: therefore, it enables accurate distance measurement in the field of radars and sonars, and enables multi-channel transmission using the SSMA communication system. As a result, large-scaled data can be transmitted simultaneously.

What is claimed is:

1. A spread-spectrum communication system comprising:
   a correlator for correlating a first input with a second input and obtaining a correlation output, one of said first input and said second input being a received signal and the other being a reference signal;
   a first code generator responsive to a first clock for generating a first PN code and supplying it as said first input of said correlator;
   a second code generator responsive to a second clock for generating a second PN code which is timeinverted with respect to said first PN code;
   logic operation means for performing a logical operation on said second PN code and said second cock and supplying a logic operation output as said second input of said correlator.

2. The system according to claim 1 wherein said first code generator is part of a sender whereas said second code generator and said logic operation means are parts of a receiver.

3. The system according to claim 1 wherein said second code generator and said logic operation means are parts of a sender whereas said first code generator is part of a receiver.

4. The system according to claim 1 wherein said logic operation means is an exclusive logic sum circuit.

5. The system according to claim 1 wherein said first and second PN codes generators are M sequence code generators.

6. An apparatus comprising: transmitter means for transmitting a spread spectrum signal which includes an information signal modulated by a first pseudo-random code, said transmitter means including first generating means for generating said first pseudo-random code; and receiver means for receiving said spread spectrum signal and for recovering therefrom said information signal, said receiver means including second generating means for generating a second pseudo-random code, and including a correlator having a first input to which is applied a reference signal which includes said second pseudo-random code and having a second input to which is applied said information signal modulated by said first pseudo-random code; wherein one of said first and second generating means includes a code generator responsive to a first clock for generating a first PN code, the pseudo-random code produced by said one of said first and second generating means being said first PN code, and wherein the other of said first and second generating means includes a code generator responsive to a second clock for generating a second PN code which is time-inverted with respect to said first PN code, and includes logic operation means for performing a logical operation using said second PN code and said second clock to produce a logic operation signal, the pseudo-random code produced by said other of said first and second generating means being said logic operation signal.

7. An apparatus of claim 6, wherein said logic operation means is an exclusive logic sum circuit.

8. An apparatus of claim 6, wherein said one of said first and second generating means is in said transmitter means and said other of said first and second generating means is in said receiver means.

9. An apparatus of claim 6, wherein said one of said first and second generating means is in said receiver means, and said other of said first and second generating means is in said transmitter means.

* * * * *